United States Patent
Gustavson et al.

(10) Patent No.: US 7,490,120 B2
(45) Date of Patent: Feb. 10, 2009

(54) METHOD AND STRUCTURE FOR PRODUCING HIGH PERFORMANCE LINEAR ALGEBRA ROUTINES USING A SELECTABLE ONE OF SIX POSSIBLE LEVEL 3 L1 KERNEL ROUTINES

(75) Inventors: Fred Gehrung Gustavson, Briarcliff Manor, NY (US); John A. Gunnels, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 10/671,935

(22) Filed: Sep. 29, 2003

(65) Prior Publication Data

US 2005/0071411 A1    Mar. 31, 2005

(51) Int. Cl.
*G06F 7/32* (2006.01)
(52) U.S. Cl. .................................................. 708/520
(58) Field of Classification Search ......... 708/620–632, 708/200–209, 520, 607
See application file for complete search history.

(56) References Cited

U.S. PATENT DOCUMENTS

| | | | |
|---|---|---|---|
| 5,025,407 A | 6/1991 | Gulley et al. | |
| 5,099,447 A | 3/1992 | Myszewski | |
| 5,513,366 A * | 4/1996 | Agarwal et al. | ............... 712/22 |
| 5,644,517 A | 7/1997 | Ho | |
| 5,825,677 A * | 10/1998 | Agarwal et al. | ............. 708/520 |
| 5,944,819 A * | 8/1999 | Kumar et al. | .................... 713/1 |
| 5,983,230 A | 11/1999 | Gilbert et al. | |
| 6,021,420 A | 2/2000 | Takamuki | |
| 6,115,730 A | 9/2000 | Dhablania et al. | |
| 6,357,041 B1 * | 3/2002 | Pingali et al. | ................ 717/154 |
| 6,470,368 B1 | 10/2002 | Garg et al. | |
| 6,507,892 B1 | 1/2003 | Mulla et al. | |
| 6,601,080 B1 | 7/2003 | Garg | |
| 6,675,106 B1 * | 1/2004 | Keenan et al. | ................. 702/28 |
| 7,028,168 B2 | 4/2006 | Wadleigh | |
| 7,031,994 B2 | 4/2006 | Lao et al. | |
| 2003/0088600 A1 | 5/2003 | Lao et al. | |
| 2004/0148324 A1 * | 7/2004 | Garg | ........................... 708/446 |

OTHER PUBLICATIONS

Vinod et al., A framework for high-performance matrix multiplication based on hierarchical abstractions, algorithms and optimized low-level kernels, 2002, Concurrency and Computation: Practice and Experience 14(10): 805-839.*

Phillip et al., PLAPACK: Parallel Linear Algebra Package Design Overview, 1997, IEEE Proceedings of the ACM/IEEE SC97 Conference.

(Continued)

*Primary Examiner*—Chat C Do
(74) *Attorney, Agent, or Firm*—Stephen C. Kaufman, Esq.; McGinn IP Law Group, PLLC

(57) ABSTRACT

A method (and structure) for improving at least one of speed and efficiency when executing level 3 dense linear algebra subroutines on a computer. An optimal matrix subroutine is selected from among a plurality of matrix subroutines stored in a memory that could alternatively perform a level 3 matrix multiplication or factorization processing.

8 Claims, 4 Drawing Sheets

OTHER PUBLICATIONS

Agarwal et al., A High Performance Algorithm Using Pre-Processing for the Sparse Matrix-Vector Multiplication, 1992, IEEE, pp. 32-41.

Volume I, "Foundations of Computer-Aided Chemical Process Design" Copyright 1981, American Institute of Chemical Engineering (2-Volume Series), pp. 77-143.

Juan J. Navarro, Elena Garcia, and Josep R. Herrero, "Data Prefetching and Multilevel Blocking for Linear Algebra Operations" in International Conference on Supercomputing (ICS'96), pp. 109-116, May 1996.

John A. Gunnels, Greg M. Henry, and Robert A. van de Geijn, "A Family of High-Performance Matrix Multiplication Algorithms," ICCS 2001, LNCS 2073, pp. 51-60, 2001 (copyright Springer-Verlag Berlin Heidelberg 2001).

Fred G. Gustavson and Andre Henriksson and Isak Jonsson and Bo Kagstrom and Per Ling: Superscalar GEMM-based Level 3 BLAS The On-going Evolution of a Portable and High-Performance Library (1998); Applied Parallel Computing, Published 1998, Springer, pp. 207-215.

Gunnels, et al., "A Family of High-Performance Matrix Multiplication Algorithms", ICCS 2001, LNCS 2073, pp. 51-60, 2001 (also available at http://www.cs.utexas.edu/users/flame/pubs/ICCS2001.pdf).

Gunnels, et al., "A Novel Theoretical Model Produces Matrix Multiplication Algorithms That Predict Current Practice", IBM Research Report RC23443 (W0411-176), Nov. 19, 2004.

"Improving performance of linear algebra algorithms for dense matrices, using algorithmic prefetch" R. C. Agarwal, F. G. Gustavson, M. Zubair; IBM Journal of Research and Development; vol. 38, Issue 3 (May 1994); pp. 265-275; Year of Publication: 1994.

\* cited by examiner

METHOD AND STRUCTURE FOR PRODUCING HIGH PERFORMANCE LINEAR ALGEBRA ROUTINES USING A SELECTABLE ONE OF SIX POSSIBLE LEVEL 3 L1 KERNEL ROUTINES

CROSS-REFERENCE TO RELATED APPLICATIONS

The following seven applications, including the present Application, are related:

1. U.S. patent application Ser. No. 10/671,887, filed on Sep. 29, 2003, to Gustavson et al., entitled "METHOD AND STRUCTURE FOR PRODUCING HIGH PERFORMANCE LINEAR ALGEBRA ROUTINES USING COMPOSITE BLOCKING BASED ON L1 CACHE SIZE";
2. U.S. patent application Ser. No. 10/671,933, filed on Sep. 29, 2003, to Gustavson et al., entitled "METHOD AND STRUCTURE FOR PRODUCING HIGH PERFORMANCE LINEAR ALGEBRA ROUTINES USING A HYBRID FULL PACKED STORAGE FORMAT";
3. U.S. patent application Ser. No. 10/671,888, filed on Sep. 29, 2003, to Gustavson et al., entitled "METHOD AND STRUCTURE FOR PRODUCING HIGH PERFORMANCE LINEAR ALGEBRA ROUTINES USING REGISTER BLOCK DATA FORMAT";
4. U.S. patent application Ser. No. 10/671,889, filed on Sep. 29, 2003, to Gustavson et al., entitled "METHOD AND STRUCTURE FOR PRODUCING HIGH PERFORMANCE LINEAR ALGEBRA ROUTINES USING LEVEL 3 PREFETCHING FOR KERNEL ROUTINES";
5. U.S. patent application Ser. No. 10/671,937, filed on Sep. 29, 2003, to Gustavson et al., entitled "METHOD AND STRUCTURE FOR PRODUCING HIGH PERFORMANCE LINEAR ALGEBRA ROUTINES USING PRELOADING OF FLOATING POINT REGISTERS";
6. U.S. patent application Ser. No. 10/671,935, filed on Sep. 29, 2003, to Gustavson et al., entitled "METHOD AND STRUCTURE FOR PRODUCING HIGH PERFORMANCE LINEAR ALGEBRA ROUTINES USING A SELECTABLE ONE OF SIX POSSIBLE LEVEL 3 L1 KERNEL ROUTINES"; and
7. U.S. patent application Ser. No. 10/671,934, filed on Sep. 29, 2003, to Gustavson et al., entitled "METHOD AND STRUCTURE FOR PRODUCING HIGH PERFORMANCE LINEAR ALGEBRA ROUTINES USING STREAMING", all assigned to the present assignee, and all incorporated herein by reference.

BACKGROUND OF THE INVENTION

1. Field of the Invention

The present invention relates generally to a technique for improving performance for linear algebra routines, with special significance to optimizing the matrix multiplication process as exemplarily implemented in the existing LAPACK (Linear Algebra PACKage) standard. More specifically, a streaming technique allows submatrices of A, B, and C to "play the role" of scalar, vector, and matrix in a general linear algebra subroutine kernel that is selectable from six possible kernels, as based on matrix size to be best stored in a cache (e.g., the L1 cache).

2. Description of the Related Art

Scientific computing relies heavily on linear algebra. In fact, the whole field of engineering and scientific computing takes advantage of linear algebra for computations. Linear algebra routines are also used in games and graphics rendering.

Typically, these linear algebra routines reside in a math library of a computer system that utilizes one or more linear algebra routines as a part of its processing. Linear algebra is also heavily used in analytic methods that include applications such as supply chain management, as well as numeric data mining and economic methods and models.

A number of methods have been used to improve performance from new or existing computer architectures for linear algebra routines.

However, because linear algebra permeates so many calculations and applications, a need continues to exist to optimize performance of matrix processing. Moreover, the conventional wisdom is that only a single kernel type is available for matrix multiplication. An improvement in operation would be possible if five more kernel types were available so that one of six kernel types could be selected as most suited. However, prior to the present invention, such a technique has been unknown and unrecognized.

SUMMARY OF THE INVENTION

In view of the foregoing and other exemplary problems, drawbacks, and disadvantages, it is, therefore, an exemplary feature of the present invention to provide various techniques that improve performance for linear algebra routines.

It is another exemplary feature of the present invention to improve factorization routines which are key procedures of linear algebra matrix processing.

It is yet another exemplary feature of the present invention to provide more efficient techniques to access data in linear algebra routines.

It is still another exemplary feature of the present invention to provide a technique in which one of six possible kernel types is selectively available, based on which of the six kernel types allows a matrix (or sub matrix, depending upon the size of the matrix) to best fit into a cache (e.g., an L1 cache). The importance of having six kernel types available is that stride one memory access is desirable for matrix processing. The matrices A, B, and C are usually stored either by row or by column.

By having six kernel types, one can choose a kernel in which stride one is available for both, or possibly three, operands. If only one, instead of six, kernel types are available, data copying must be done to provide the format of the single kernel conventionally used. This means a certain performance loss that might even have to be repeated several times during the processing.

To achieve the above purposes, in a first exemplary aspect of the present invention, described herein is a method (and structure) for executing linear algebra subroutines on a computer, including selecting a matrix subroutine from among a plurality of matrix subroutines that performs the matrix multiplication.

In a second exemplary aspect of the present invention, described herein is a signal-bearing medium tangibly embodying a program of machine-readable instructions executable by a digital processing apparatus to perform the above-described method of executing linear algebra subroutines on a computer.

In a third exemplary aspect of the present invention, described herein is a method of providing a service involving at least one of solving and applying a scientific/engineering problem, including at least one of: using a linear algebra software package that performs one or more matrix processing operations, wherein the linear algebra software package selects a matrix subroutine from among a plurality of matrix subroutines that performs a matrix multiplication; providing a consultation for solving a scientific/engineering problem using the linear algebra software package; transmitting a result of the linear algebra software package on at least one of a network, a signal-bearing medium containing machine-readable data representing the result, and a printed version representing the result; and receiving a result of the linear algebra software package on at least one of a network, a signal-bearing medium containing machine-readable data representing the result, and a printed version representing the result.

BRIEF DESCRIPTION OF THE DRAWINGS

The foregoing and other exemplary features, objects, aspects and advantages will be better understood from the following detailed description of exemplary embodiments of the invention with reference to the drawings, in which:

FIG. 5 illustrates a signal bearing medium 500 (e.g., storage medium) for storing steps of a program of a method according to the present invention.

DETAILED DESCRIPTION OF EXEMPLARY EMBODIMENTS OF THE INVENTION

Figure 1:
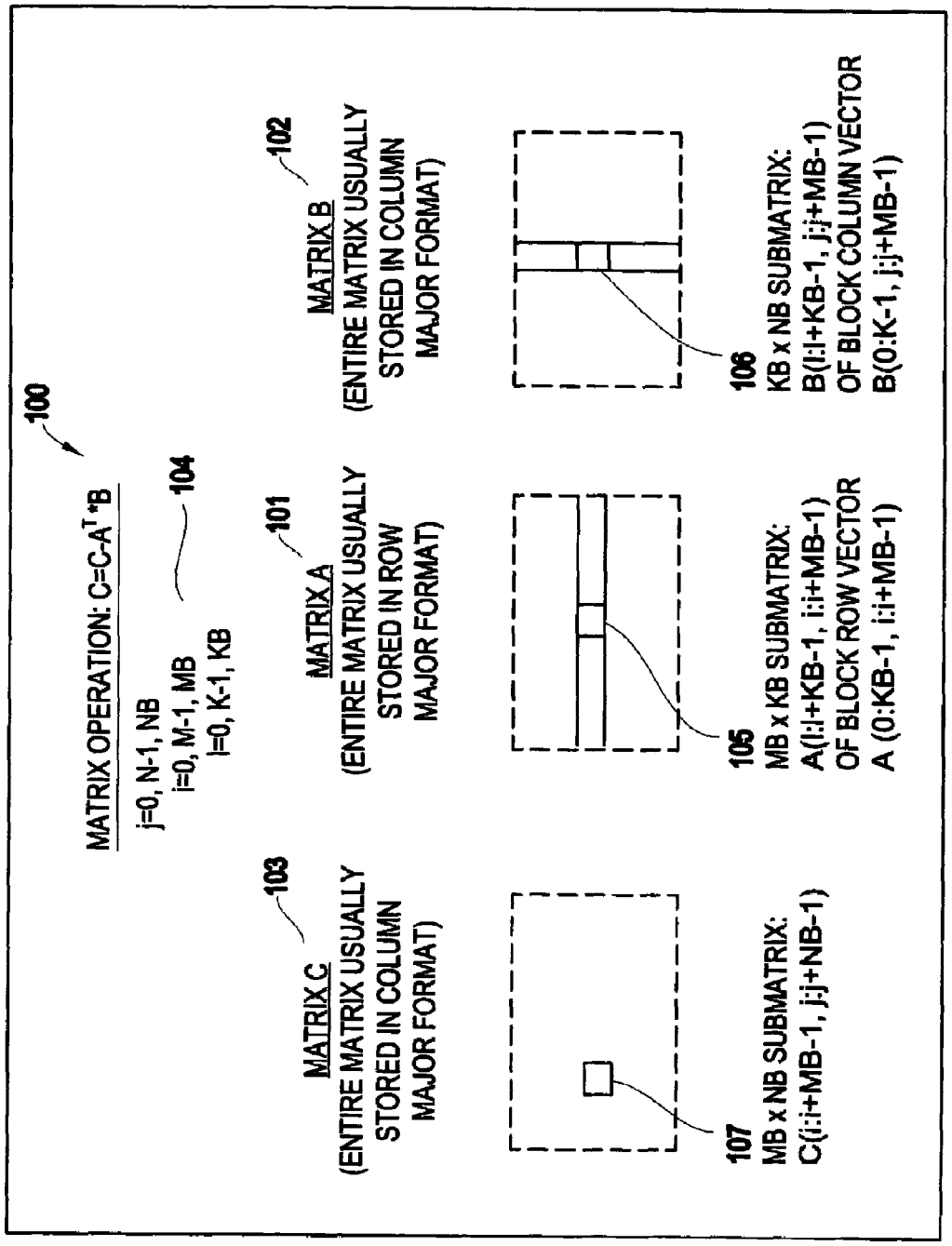
FIG. 1 illustrates a matrix representation for an operation 100 exemplarily discussed herein.

Referring now to the drawings, and more particularly to FIG. 1, a preferred embodiment of the present invention will now be discussed. The present invention addresses efficiency in the calculations of linear algebra routines, as shown exemplarily in FIG. 1, in which is illustrated a processing of the matrix operation $C=C-A^T*B$. For purpose of discussion only, Level 3 BLAS (Basic Linear Algebra Subprograms) of the LAPACK (Linear Algebra PACKage) are used, but it is intended to be understood that the concepts discussed herein are easily extended to other linear algebra mathematical operations and math library modules.

FIG. 1 illustrates processing of an exemplary matrix operation 100 (e.g., $C=C-A^T*B$). In processing this operation, matrix A is first transposed to form transpose-matrix-A (e.g., $A^T$) 101. Next, transposed matrix $A^T$ is multiplied with matrix B 102 and then subtracted from matrix C 103. The computer program executing this matrix operation will achieve this operation using three loops 104 in which the element indices of the three matrices A, B, C will be varied in accordance with the desired operation.

That is, as shown in the lower section of FIG. 1, the inner loop and one step of the middle loop will cause indices to vary so that MB rows 105 of matrix $A^T$ will multiply with NB columns 106 of matrix B. The index of the outer loop will cause the result of the register block row/column multiplications to then be subtracted from the MB-by-NB submatrix 107 of C to form the new submatrix 107 of C. FIG. 1 shows an exemplary "snapshot" during execution of one step of the middle loop i=i:i+MB−1 and all steps of the inner loop 1, with the outer loop j=j:j+NB−1.

A key idea of the generalized streaming discussed herein is the generalization of Example 1 shown in FIG. 1 for higher levels of the memory hierarchy. In Example 1, there is a cache-resident matrix $A^T$ of size K1×M1, a vector block B of size K1×N0, and a scalar block C of size M0×N0. At a given instant of time, the sizes of the vector block and scalar block is of order 0 and the size of the A is of order 1.

All of a piece of C and part of a piece of B has size of order 2, and these pieces of C and B reside in the next higher level of the memory hierarchy, namely L2 cache. In L2 cache we have cache resident matrix C of size M2×N2 and, at a given instant in time, streaming pieces (vector block B of size K1×N2) and scalar block A of size M1×K1.

Before stopping here, we mention briefly TLB (Translation Lookaside Buffer). The TLB is a term well understood in the art as referring to accessing data residing in the memory spanned by the current TLB pages. Usually, the size of the TLB is a sizable fraction of the size of the L2 cache.

Thus, in the above paragraph, the size of N2 is chosen so that the cache resident piece and the two streaming pieces can "fit" into the TLB. By doing so, TLB thrashing can be avoided.

Returning, the generalization should be clear. In level 3 cache, we have cache resident matrix piece of A of size M3×K3 and, at a given instance of time, a vector block piece of B of size K3×N2 and a scalar block piece of C of size M2×N2.

In the present invention, contrary to conventional techniques in which a single kernel type is relied upon for matrix multiplication, there are six kernel types available, and increased efficiency results when the most appropriate kernel type of the six is chosen. The best kernel type results by choosing the kernel type that allows one of the matrices to fit into a cache, which is typically the L1 cache.

Having only one kernel type, instead of six, means that data copy must be done to provide the format of the single conventional kernal type. Thus, a certain performance loss occurs that might even have to be repeated several times.

Moreover, when it is recognized that each of three matrices A, B, C can potentially be stored in either row major or column major. Accordingly, there are eight possible combinations that any three matrices to be presented in row-major and column-major. Having six kernel types instead of one standard kernel type, and recognizing that eight potential row-major/column-major combinations exist for three matrices provides a potential to more appropriately select a kernel type in combination with a selected storage format for each matrix, thereby providing an even higher efficiency than the conventional wisdom.

The technique of the present invention is related to the more general technique of streaming data during matrix processing. This generalized streaming is more fully described in the seventh of the above-identified co-pending applications. In this seventh co-pending application is described how the remaining two matrices in streaming are best dealt with, once one matrix has been selected for the L1 cache in accordance with the present invention.

However, before presenting the details of the present invention, the following general discussion provides a background of linear algebra subroutines and computer architecture as related to the terminology used herein.

Linear Algebra Subroutines

The explanation of the present invention includes reference to the computing standard called LAPACK (Linear Algebra PACKage) and to various subroutines contained therein. When LAPACK is executed, the Basic Linear Algebra Subprograms (BLAS), unique for each computer architecture and provided by the computer vendor, are invoked. LAPACK comprises a number of factorization algorithms for linear algebra processing.

For example, Dense Linear Algebra Factorization Algorithms (DLAFAs) include matrix multiply subroutine calls, such as Double-precision Generalized Matrix Multiply (DGEMM). At the core of level 3 Basic Linear Algebra Subprograms (BLAS) are "L1 kernel" routines which are constructed to operate at near the peak rate of the machine when all data operands are streamed through or reside in the L1 cache.

The most heavily used type of level 3 L1 DGEMM kernel is a Double-precision A Transpose multiplied by B (DATB), that is, $C=C-A^T*B$, where A, B, and C are generic matrices or submatrices, and the symbology $A^T$ means the transpose of matrix A (e.g., see FIG. 1). It is noted that DATB is the only such kernel employed by today's state of the art codes, although DATB is actually only one of six possible kernel types.

The DATB kernel operates so as to keep the A operand matrix or submatrix resident in the L1 cache. Since A is transposed in this kernel, its dimensions are K1 by M1, where K1×M1 is roughly equal to the size of the L1. Matrix A can be viewed as being stored by row, since in Fortran, a non-transposed matrix is stored in column-major order and a transposed matrix is equivalent to a matrix stored in row-major order. Because of asymmetry (C is both read and written) K1 is usually made to be greater than M1, as this choice leads to superior performance.

Exemplary Computer Architecture

Figure 2:
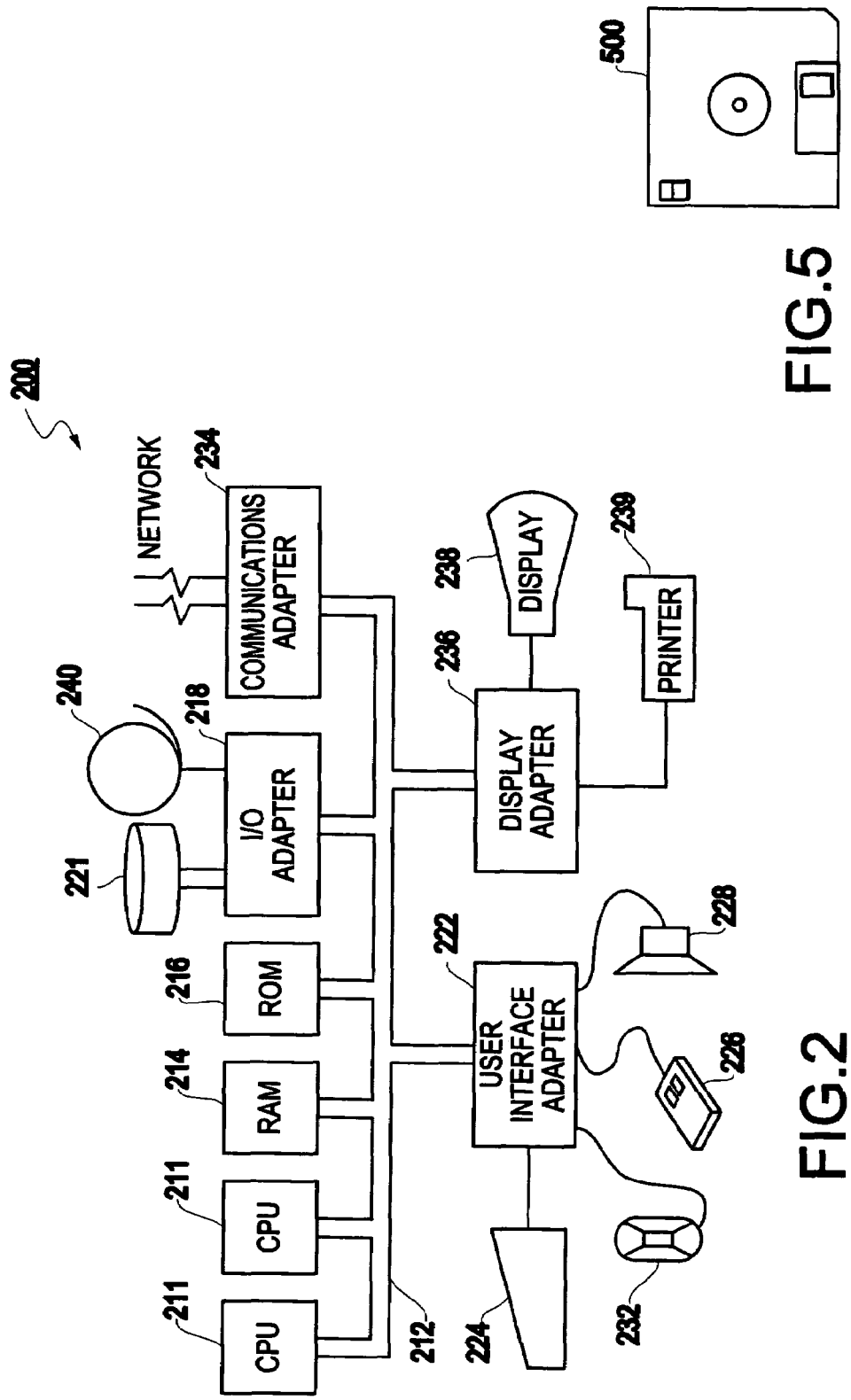
FIG. 2 illustrates an exemplary hardware/information handling system 200 for incorporating the present invention therein.

FIG. 2 shows a typical hardware configuration of an information handling/computer system 200 usable with the present invention. Computer system 200 preferably has at least one processor or central processing unit (CPU) 211. Any number of variations are possible for computer system 200, including various parallel processing architectures and architectures that incorporate one or more FPUs (floating-point units).

In the exemplary architecture of FIG. 2, the CPUs 211 are interconnected via a system bus 212 to a random access memory (RAM) 214, read-only memory (ROM) 216, input/output (I/O) adapter 218 (for connecting peripheral devices such as disk units 221 and tape drives 240 to the bus 212), user interface adapter 222 (for connecting a keyboard 224, mouse 226, speaker 228, microphone 232, and/or other user interface device to the bus 212), a communication adapter 234 for connecting an information handling system to a data processing network, the Internet, an Intranet, a personal area network (PAN), etc., and a display adapter 236 for connecting the bus 212 to a display device 238 and/or printer 239 (e.g., a digital printer or the like).

Although not specifically shown in FIG. 2, the CPU of the exemplary computer system could typically also include one or more floating-point units (FPUs) that performs floating-point calculations. Computers equipped with an FPU perform certain types of applications much faster than computers that lack one. For example, graphics applications are much faster with an FPU. An FPU might be a part of a CPU or might be located on a separate chip. Typical operations are floating point arithmetic, such as fused multiply/add (FMA), addition, subtraction, multiplication, division, square roots, etc.

Figure 3:
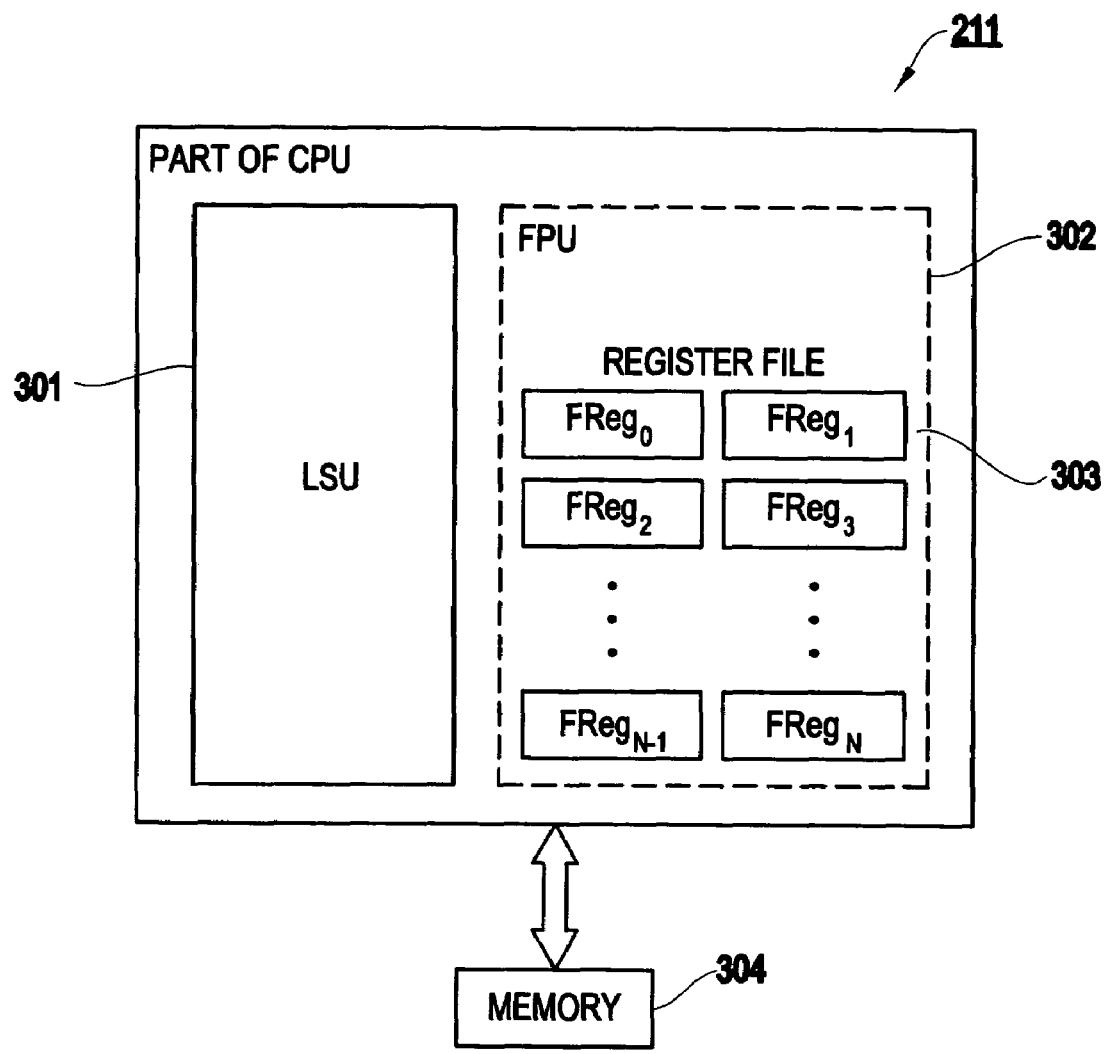
FIG. 3 illustrates an exemplary CPU/Floating Point Unit (FPU) architecture 302 as might be used to incorporate the present invention.

Details of the FPU are not so important for an understanding of the present invention, since a number of configurations are well known in the art. FIG. 3 shows an exemplary part of a typical CPU 211 that includes at least one FPU 302. The FPU function of CPU 211 controls the FMAs (floating-point multiply/add), at least one load/store unit (LSU) 301 to load a number of floating point registers (FReg's) 303.

It is noted that in the context of the present invention involving linear algebra processing, the term "FMA" can also be translated as "fused multiply-add" operation/unit, but the present discussion does not care which of the translations is used. The role of the LSU 301 is to move data from a memory device 304 to the registers 303 used by the FMA 302 and to subsequently transfer the results back into a memory device 304.

Figure 4:
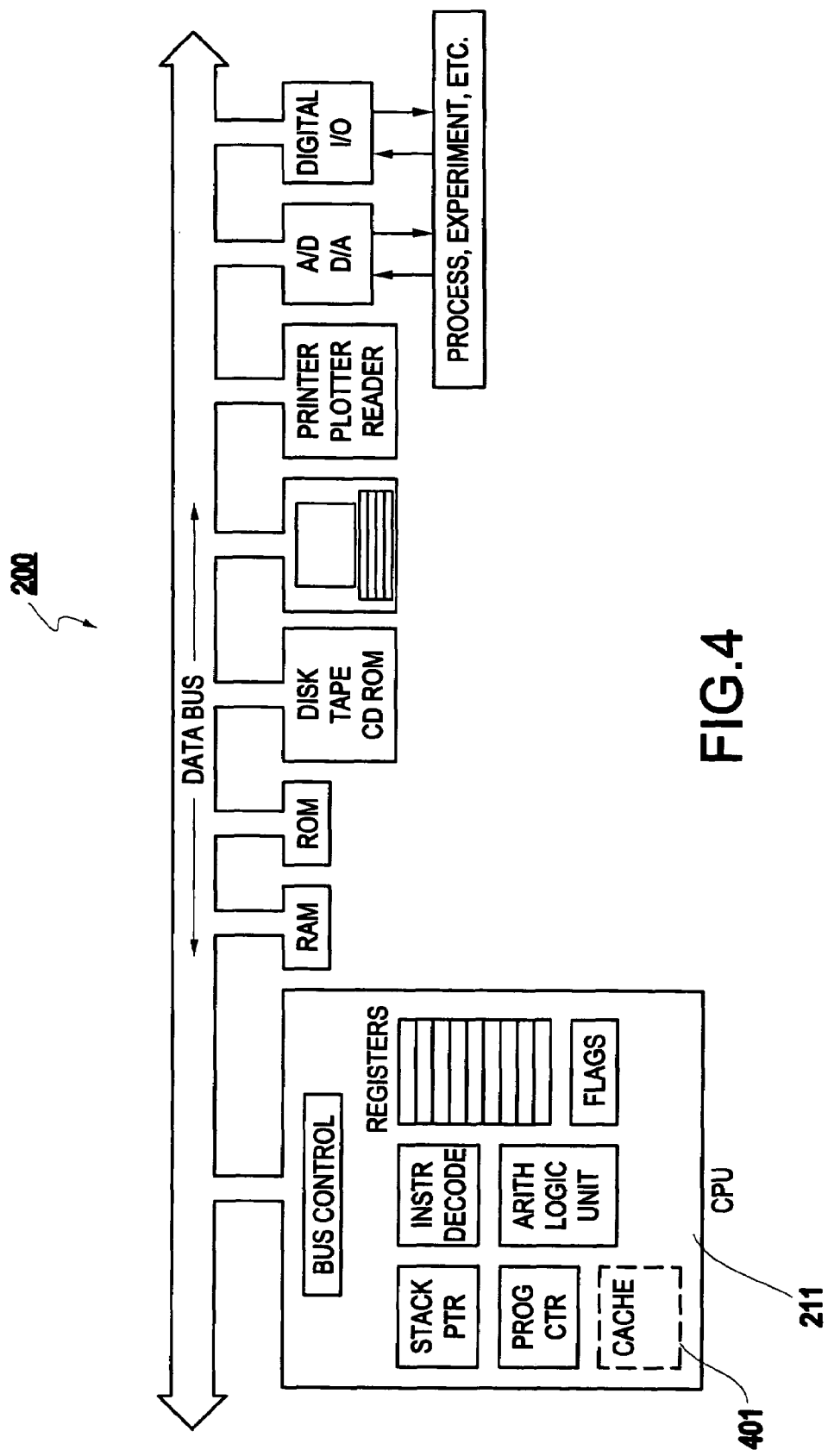
FIG. 4 exemplarily illustrates in more detail a CPU 211 that might be used in the computer system 200 for the present invention.

Another important exemplary aspect of the present invention relates to computer architecture that incorporates a memory hierarchy involving one or more cache memories. FIG. 4 shows in more detail how the simple computer system 200 might incorporate a cache 401 in the CPU 211.

Discussion of the present invention includes reference to levels of cache, and more specifically, level 1 cache (L1 cache), level 2 cache (L2 cache) and even level 3 cache (L3 cache). Level 1 cache is typically considered as being a cache that is closest to the CPU and might even be included as a component of the CPU, as shown in FIG. 4. A level 2 (and higher-level) cache is typically considered as being a cache outside the CPU.

The details of the cache structure and the precise location of the cache levels are not so important to the present invention so much as recognizing that memory is hierarchical in nature in modem computer architectures and that matrix computation can be enhanced considerably by modifying the processing of matrix subroutines to include considerations of the memory hierarchy.

Additionally, in the present invention, it is preferable that the matrix data be laid out contiguously in memory in "stride" one form. "Stride one" means that the data is preferably contiguously arranged in memory to honor double-word boundaries and the useable data is retrieved in increments of the line size.

The importance of having six kernel types available is that stride one memory access is desirable for matrix processing. The matrices A and B are usually stored either by row or by column. By having six kernel types, one can choose a kernel in which stride one is available for both operands. Having only one kernel type, instead of six kernel types, means that data copy must be done to provide the format of the one conventional kernel. This means a certain performance loss that might have to be repeated several times.

Selecting One Level 3 L1 Kernel Routines for General Matrix Multiplication from Six Possible Kernels All modem programming languages (C, Fortran, etc.) store matrices as two-dimensional arrays. That is, let matrix A have M rows and N columns. The standard column major format of A is as follows.

Each of the N columns of A are stored as a contiguous vector (stride 1). Each of the M rows of A are stored with consecutive elements separated by LDA (Leading Dimension of A) storage locations (stride LDA). Let A(0,0) be stored in memory location $\alpha$. The matrix element A(i,j) is stored in memory location $\alpha+i+LDA*j$. It is important to note here that stride 1 is optimal for memory accesses and that stride LDA is poor. Also, almost all level 3 linear algebra code treats rows and columns about equally.

Modern architectures support this programming language construct. Further, existing codes support this data structure. Thus, a majority of programming architectures support, in their machine (engineering) implementations, machine (optimized) instructions that can be used to easily address and, hence, quickly access elements of one- and two-dimensional arrays that are stored in traditional formats. At the register level, the register block submatrices are stored in a fashion to optimally exploit FPU enhanced hardware.

The underlying program construct that supports one- and two-dimensional arrays is the FOR or DO loop. This is an example of generalized counting via arithmetic progression:

DO i=istart, iend, istep
ENDDO.

When a contiguous array that fits in the L1 cache is accessed using this programming construct, near-peak performance can be obtained (provided there is a good L1 cache-FPU register interface) because the architectures are optimized to be as efficient as possible.

Traditional IJL (FOR) loop implementations of level 3 L1 DGEMM are likely to be optimal when the underlying arrays are contiguous and map well into the L1 cache. Thus, there is at most six (3!=3×2) level 3 L1 DGEMM kernels to consider. Despite conventional practice, which employs only one kernel type, all six kernel types are viable under appropriate circumstances, as recognized by the present inventors. Stride-one data access is the most efficient form of accessing data. Application of the fact is less important when the entire two-dimensional arrays resides in L1 cache as, often, for data in L1 cache, access time behaves in a manner consistent with (uniform) RAM (Random Access Memory).

Thus, in the context of the present invention, "streaming" occurs when parts of matrices fit in the L2 cache, rather than the L1 cache, and will be accessed systematically as explained below. In other words, typically only one of the matrices, or a submatrix thereof, is L1 cache-resident.

The pattern of all six kernel types is to have an L1 cache resident matrix operand while the remaining two matrix operands (called streaming matrices) reside in the next higher memory level, L2 in this case. The outer loop variable defines the common order of streaming. The size of the common dimension of the two streaming matrices is determined by the size of cache L2.

That is, if N is assumed to be the streaming dimension, the two streaming matrices are C and B, whose dimensions are M by N and K by N. Storage for C and B is MN and KN, respectively. If cache L2 has size L2S, then, assuming that C is the cache resident matrix of L2, MN<L2S or N<L2S/M.

The present invention describes streaming for the six kernel types. At level L1, there is a cache resident matrix and two matrices streaming from level L2 (see also FIG. 1). The final one of the above-identified co-pending applications describes how to choose the cache resident matrix at level L2 (more generally, at level i+1) from the remaining two choices after the matrix has been selected for L1 (more generally, level i). However, a key concept of the present invention is the recognition that, contrary to conventional wisdom in which a single kernel type is used, there are six kernel types possible to use in linear algebra processing (e.g., matrix multiplication) and that an optimal kernel type of the six potential kernel types can be selected.

Having only one, instead of six, kernel types means that data copy must be done to provide the format of the one conventional kernel. This causes a certain performance loss that might even have to be repeated several times.

As an example, the IJL forms of DGEMM leading to DAXPY (scaled vector addition) and DDOT (dot-product) forms are now presented. For example, the equation C=C−A*B can be considered with either:

DDOT→$C=C-A^T*B$ (e.g., transpose A and use DATB)

DAXPY→$C=C-A*B$ (e.g., copy A and use DAB kernel)

Any IJL form leads to a cache residency pattern of matrices A, B, and C of type matrix, vector, and scalar (e.g., more specifically, patterns where submatrices of A, B, and C "play the role" of scalar, vector, and matrix in the kernel).

Thus, more specifically, in the context of the present invention, one is using streaming where the vector and scalar parts of matrices fit in the L2 (not L1) cache. In other words, only the submatrix playing the role of the matrix is L1 cache-resident.

To illustrate the technique of streaming, one of the DDOT kernels is used. However, the same holds true for the other DDOT kernel and all 4 DAXPY kernels. A simplified DATB kernel (JIL order) (see also FIG. 1), including 4-by-4-by-1 register blocking, follows:

```
do j = 0, N−4, 4
  do i = 0, M−4, 4
    Tij = C(i:i+3,j:j+3)           ! 16 loads of C
    do l = 0, K−1
      Ai = A(l,i:i+3)              ! 4 loads of A^T
      Bj = A(l,j:j+3)              ! 4 loads of B
      Tij = Tij + Ai * Bj          ! 16 FMAs
    enddo
    C(i:i+3,j:j+3) = Tij           ! 16 stores of C
  enddo
enddo
```

In the DATB kernel illustrated above, consider the outer do loop on j as removed, and then consider one iteration (i=i→i+3) of the middle loop. The matrix data necessary for this iteration is A(0:K−1,i:i+3), B(0:K−1,j:j+3), and C(i:i+3,j:j+3). During this execution time interval, 16 elements of C are needed, as are four vectors, B(0:K−1,j:j+3) (also, see FIG. 1). Now, consider the entire middle loop with J fixed at j:j+3. During this larger execution time interval, all of A(0:K−1,0:M−1) matrix, a 4 vector of B(0:K−1,j:j+3), and scalar pieces (C(i:i+3,j:j+3), read in and written out) of C(0:M−1,j:j+3) are required.

To summarize, during one iteration of the outer loop, cache residency includes a scalar piece or pieces of C, a vector piece of B, and the entire contiguous matrix A. It follows that the entire execution of DATB (over the outer loop) includes streaming vectors of B and scalars of C from L2 into and out of L1, during which the entire matrix A remains cache resident.

FIG. 1 illustrates the above DATB kernel just discussed above.

It is noted that tiny pieces of B and C that reside in L1 during one iteration of the outer loop are reused M and K times, respectively. Thus, their initial loading penalty from L2 is amortized by those selfsame factors.

The remaining five loop permutations: IJL, ILJ, LIJ, JLI, and LJI each give rise to matrix, vector, and scalar patterns of input matrices BAC, BCA, CBA, ACB, and CAB, respectively. The last four patterns are DAXPY kernels while the first is the second DDOT kernel.

The pattern of all six kernels is to have an L1 cache resident matrix operand while the remaining two matrix operands (called "streaming matrices") reside either entirely or in pieces in the next higher memory level (e.g., L2 in this case). The outer loop variable, N for the DDOT kernel above, defines the common order of streaming. The size of the common dimension of the two streaming matrices (e.g. B and C has common dimension N in the DDOT example above) is determined by the size of L2 (e.g., N<L2S/M if C is the matrix resident in L2).

Previous work reduced the poly-algorithmic count from $6^m$ to $2^m$, where m=M+1 is the number of memory hierarchy levels. Furthermore, previous work emphasized only one of six kernels but stating that a second DDOT kernel type was possible. Here, it has been shown that this complexity can be reduced to four, irrespective of the number of levels in the memory hierarchy. Also, at the L1 level, this invention admits (see also the seventh above-listed copending application) that six kernel types are possible or desirable instead of just one or two kernel types.

In combination with the concepts of the final one of the above-referenced co-pending applications, it is shown by the present invention that this complexity can be reduced to 6, irrespective of the number of levels in the memory hierarchy. In essence, two kernel type algorithms X and Y (e.g., the appropriate kernel, as available from six possible kernel types) are selected, as optimal for the lowest two levels of the hierarchy, based on the input matrix sizes and their storage arrangement.

It follows that, with data copying in preparation for execution, which data copying is a one-time cost, these IJL ideas generalize to all l=1, ..., M caches, plus main memory (i.e., a total of M+1 levels of memory). For purposes of the present invention, this more general concept of streaming is referred to as "generalized streaming", and is further discussed in the seventh above-identified co-pending application.

In an exemplary environment, the present invention leverages the concepts of the remaining above-identified co-pending applications. Of particular interest for the present invention, in order to achieve peak efficiency, the concepts discussed herein can advantageously be combined with those of the fourth and fifth above-identified co-pending applications. That is, the prefetching of data into L1 cache and the preloading of data into the FRegs will result in a synergy of the present invention in which a kernel is chosen as best to execute an operation, as based on dimensions of the matrices, and efficiency is further improved by the prefetching and preloading discussed elsewhere.

Alternatively, one could view the combination of prefetching and preloading with the present invention as being a case where prefetching and/or preloading are applied to the present invention, since all six of the possible kernels have different pre-fetching patterns.

The present invention can also be combined with the concepts of the third of the above-identified co-pending applications, or a variation thereof.

Software Product Embodiments

In addition to the hardware/software environment described above, a different exemplary aspect of the invention includes a computer-implemented method for performing the invention.

Such a method may be implemented, for example, by operating a computer, as embodied by a digital data processing apparatus, to execute a sequence of machine-readable instructions. These instructions may reside in various types of signal-bearing media.

Thus, this exemplary aspect of the present invention is directed to a programmed product, comprising signal-bearing media tangibly embodying a program of machine-readable instructions executable by a digital data processor incorporating the CPU 211 and hardware above, to perform the method of the invention.

This signal-bearing media may include, for example, a RAM contained within the CPU 211, as represented by the fast-access storage for example. Alternatively, the instructions may be contained in another signal-bearing media, such as a magnetic data storage diskette 500 (FIG. 5), directly or indirectly accessible by the CPU 211.

Whether contained in the diskette 500, the computer/CPU 211, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless.

The second exemplary aspect of the present invention can be embodied in a number of variations, as will be obvious once the present invention is understood. That is, the methods of the present invention could be embodied as a computerized tool stored on diskette 500 that contains a series of matrix subroutines to solve scientific and engineering problems using matrix processing. Alternatively, diskette 500 could contain a series of subroutines that allow an existing tool stored elsewhere (e.g., on a CD-ROM) to be modified to incorporate one or more of the features of the present invention which will be described shortly. It should also be obvious to one of skill in the art that the matrix subroutines described or referred to herein can be downloaded through a network interface from a remote storage facility.

The second exemplary aspect of the present invention additionally raises the issue of general implementation of the present invention in a variety of ways.

For example, it should be apparent, after having read the discussion above that the present invention could be implemented by custom designing a computer in accordance with the principles of the present invention. For example, an operating system could be implemented in which linear algebra processing is executed using the principles of the present invention.

In a variation, the present invention could be implemented by modifying standard matrix processing modules, such as described by LAPACK, so as to be based on the principles of the present invention. Along these lines, each manufacturer could customize their BLAS subroutines in accordance with these principles.

It should also be recognized that other variations are possible, such as versions in which a higher level software module interfaces with existing linear algebra processing modules, such as a BLAS or other LAPACK module, to incorporate the principles of the present invention.

Moreover, the principles and methods of the present invention could be embodied as a computerized tool stored on a memory device, such as independent diskette 500, that contains a series of matrix subroutines to solve scientific and engineering problems using matrix processing, as modified by the technique described above. The modified matrix subroutines could be stored in memory as part of a math library, as is well known in the art. Alternatively, the computerized tool might contain a higher level software module to interact with existing linear algebra processing modules. It should also be obvious to one of skill in the art, after reading the present specification, that the instructions for the technique described herein can be downloaded through a network interface from a remote storage facility.

All of these various embodiments are intended as included in the present invention, since the present invention should be appropriately viewed as a method to enhance the computation of matrix subroutines, as based upon recognizing how linear algebra processing can be more efficient by using the principles of the present invention.

In yet another exemplary aspect of the present invention, it should also be apparent to one of skill in the art that the principles of the present invention can be used in yet another environment in which parties indirectly take advantage of the present invention.

For example, it is understood that an end user desiring a solution of a scientific or engineering problem may undertake to directly use a computerized linear algebra processing method that incorporates the method of the present invention. Alternatively, the end user might desire that a second party provide the end user the desired solution to the problem by providing the results of a computerized linear algebra processing method that incorporates the method of the present invention. These results might be provided to the end user by a network transmission or even a hard copy printout of the results.

The present invention is intended to cover all these various methods of using the present invention, including the end user who uses the present invention indirectly by receiving the results of matrix processing done in accordance with the principles of the present invention.

The present invention provides a generalized technique that improves performance for linear algebra routines. The method and structure discussed here, yields higher-performance linear algebra routine processing by selecting the most appropriate kernel (of six possible kernels) that permits one of the matrices to best fit into the L1 cache.

While the invention has been described in terms of an exemplary embodiment, those skilled in the art will recognize that the invention can be practiced with modification within the spirit and scope of the appended claims.

All of these various embodiments are intended as included in the present invention, since the present invention should be appropriately viewed as one aspect of a method that provides efficiency in the computation of conventional matrix subroutines by streaming data efficiently from higher levels of cache during execution of linear algebra subroutines.

Further, it is noted that, Applicants' intent is to encompass equivalents of all claim elements, even if amended later during prosecution.

The invention claimed is:

1. A method of improving at least one of speed and efficiency when executing a level 3 dense linear algebra processing on a computer, said method comprising:
  automatically setting an optimal machine state on said computer for said processing by selecting an optimal matrix subroutine from among a plurality of matrix subroutines stored in a memory that could alternatively perform a level 3 matrix multiplication processing, wherein said computer includes an L1 cache, said method further comprising:
    determining a size of each of matrices involved in said matrix multiplication; and
    selecting one of said matrices to reside in an L1 cache, based on said determined size,
  wherein said selecting a matrix subroutine comprises determining which of said matrix subroutines is consistent with said matrix selected to reside in said L1 cache.

2. The method of claim 1, wherein said matrix subroutine comprises a substitute of a subroutine from LAPACK (Linear Algebra PACKage).

3. The method of claim 2, wherein said substitute LAPACK subroutine comprises a Basic Linear Algebra Subroutine (BLAS) Level 3 L1 cache kernel.

4. The method of claim 1, wherein said plurality of matrix subroutines comprises six possible matrix subroutines that could alternatively be used for said level 3 matrix multiplication processing.

5. An apparatus, comprising:
  a memory to store matrix data to be used for a processing in a level 3 dense linear algebra program;
  an L1 cache;
  a processor to perform said processing; and
  a selector to select an optimal one of a plurality of possible matrix subroutines that could alternatively perform said processing, thereby automatically setting said apparatus into an optimal machine state to perform said processing, wherein said selector makes the selection by:
    determining a size of each of matrices involved in said level 3 processing; and
    selecting one of said matrices to reside in said L1 cache, based on said determined sizes,
  wherein said selecting a matrix subroutine comprises determining which of said matrix subroutines is consistent with said matrix selected to reside in said L1 cache.

6. The apparatus of claim 5, wherein said matrix subroutine comprises a substitute of a subroutine from LAPACK (Linear Algebra PACKage).

7. The apparatus of claim 6, wherein said substitute LAPACK subroutine comprises a Basic Linear Algebra Subroutine (BLAS) Level 3 L1 cache kernel.

8. The apparatus of claim 5, wherein said plurality of matrix subroutines comprises six possible matrix subroutine kernel types.

* * * * *